United States Patent [19]

Tabuchi

[11] Patent Number: 5,363,354
[45] Date of Patent: Nov. 8, 1994

[54] DISK PLAYER WITH VARIABLE LEVEL SEARCH TIME

[75] Inventor: Yoichi Tabuchi, Higashihiroshima, Japan

[73] Assignee: Sharp Kabushiki Kaisha, Osaka, Japan

[21] Appl. No.: 16,197

[22] Filed: Feb. 11, 1993

Related U.S. Application Data

[63] Continuation of Ser. No. 604,897, Oct. 30, 1990, abandoned.

[30] Foreign Application Priority Data

Nov. 1, 1989 [JP] Japan .................. 1-287066
Dec. 15, 1989 [JP] Japan .................. 1-326548

[51] Int. Cl.$^5$ ................................ G11B 7/00
[52] U.S. Cl. .................... 369/32; 369/44.28
[58] Field of Search ............. 369/32, 43, 44.28, 33, 369/34, 58, 56, 48, 59, 47, 85, 41, 30, 31; 360/78.05, 77.06, 77.03, 75

[56] References Cited

U.S. PATENT DOCUMENTS

| | | | |
|---|---|---|---|
| 4,805,050 | 2/1989 | Aoyagi et al. | 360/72.2 |
| 4,817,075 | 3/1989 | Kikuchi et al. | 369/41 |
| 4,882,719 | 11/1989 | Kimura et al. | 369/32 |
| 4,916,682 | 4/1990 | Tomoda et al. | 369/32 |
| 4,916,685 | 4/1990 | Endoh et al. | 369/56 |
| 4,996,679 | 2/1991 | Yoshio | 369/47 |
| 5,001,570 | 3/1991 | Tagawa | 369/32 X |
| 5,008,872 | 4/1991 | Tomoda et al. | 369/58 X |
| 5,101,386 | 3/1992 | Kojima et al | 369/32 |
| 5,122,886 | 6/1992 | Tanka | 369/47 X |
| 5,132,946 | 7/1992 | Tanaka | 369/32 |

FOREIGN PATENT DOCUMENTS

| | | |
|---|---|---|
| 0114508A1 | 8/1984 | European Pat. Off. . |
| 0255918A2 | 2/1988 | European Pat. Off. . |
| 0283304A2 | 9/1988 | European Pat. Off. . |
| 0363186A3 | 4/1990 | European Pat. Off. . |
| 0171730 | 10/1983 | Japan . |
| 60-125975 | 7/1985 | Japan . |
| 64-60887 | 3/1989 | Japan . |
| 0204287 | 8/1989 | Japan . |
| 0298887 | 4/1990 | Japan . |

Primary Examiner—Aristotelis Psitos
Assistant Examiner—Thang V. Tran
Attorney, Agent, or Firm—Nixon & Vanderhye

[57] ABSTRACT

A CD player having an improved level search function is disclosed. In a level search, the judgment whether or not an optical pickup can land again on the same song is done before the jump of the pickup. When it is judged that the pickup can land on the same song, the pickup jumps a predetermined number of tracks which is determined for each of selected songs depending upon the playing time of each song. When it is judged that the pickup cannot land on the same song, the pickup jumps to the beginning of the next programmed song so that unwilling playback of non-programmed songs can be avoided. In another CD player, it is successively judged whether or not the pickup can land again on the same song in level search, based on the playing time of the song, the elapsed playing time and the playing time corresponding a predetermined number of tracks to be skipped. If the pickup can land on the same song, then the predetermined number of tracks are skipped. If the pickup cannot land on the same song, then it is skipped to the beginning of the next programmed song, whereby the pickup is prevented from landing on non-programmed songs. Therefore, level search can be accurately performed.

9 Claims, 6 Drawing Sheets

DISK PLAYER WITH VARIABLE LEVEL SEARCH TIME

This is a continuation of application Ser. No. 07/604,897, filed Oct. 30, 1990, now abandoned.

BACKGROUND OF THE INVENTION

1. Field of the Invention

This invention relates to a disk player, and more particularly to a disk player such as a CD player, an LD player and a CD-V player which has an improved level search system.

2. Description of the Prior Art

Generally, such a disk player has a function of programming the sequence of playing back two or more pieces of music or songs (hereinafter, referred to as merely "songs") which are respectively recorded in sections of a disk (e.g., a so-called compact disk). Before performing quick listening of such programmed songs or setting of the recording level for dubbing them to a cassette tape or the like, it is desirable to sequentially search each of the programmed songs to confirm their output levels. Hereinafter, such a search is referred to as "a level search".

Referring to FIG. 6, the level search in a conventional CD player will be described.

When a compact disk is loaded in the CD player, initialization is performed in step N1; that is, data recorded in the table of contents (TOC) on the inside track of the disk is read. Next, the songs to be played back are selected by performing a so-called programming operation, more specifically the song numbers of the songs to be played back are selected and stored in a suitable memory device (step N2), and then the level search mode is set by pressing a level search key (step N3), In the level search mode, a long search in which the optical head or pickup jumps to the beginning of the first one of the programmed songs which are selected in step N2 is conducted, and the first song is played back from the beginning for a fixed period of time, e.g., 100 ms, (step N4). Next, the optical pickup jumps a prefixed number of tracks (e.g., 40 tracks), and playback is performed for 100 ms (step N5). In step N6, the subcode included in the playback signal obtained in step N5 is checked whether or not the song number has changed. If the song number has not changed, then processing returns to step N5 so that the optical pickup jumps further 40 tracks and playback is performed again for 100 ms.

If it is judged in step N6 that the song number has changed, then it is checked in step N7 whether or not the song number obtained in step N5 is the next programmed song number. When the obtained song number is the next programmed song number, then processing returns to step N5. If the obtained song number is not the next programmed song number, then it is checked whether or not the obtained song number is the last programmed number (i.e., all of the programmed songs have been played back) (step N8). If YES, then the operation of the level search stops (step N9). If NO, then the optical pickup is jumped to the beginning of the next programmed song which is in turn played back for 100 ms from the beginning (step N10). Processing then returns to step N5. The output signals in steps N4, N5 and N10 are processed to obtain the output level of the programmed songs, and the output level for the programmed songs is determined.

In a level search in such a prior art CD player, the beginning of a programmed song is searched, and then operations in which a fixed number of tracks is jumped and the song is played back for a fixed period of time are repeated until the optical pickup reaches the next song. When the level search for the song has been completed, the beginning of the next programmed song is searched, and the same operations (i.e., a fixed number of tracks is jumped and playback is performed for a fixed period of time) are repeated, whereby the recording level can be set based on the playback signal obtained from playing back the songs.

In a level search of such a prior art disk player, irrespective of the lengths of the programmed songs, the number of tracks which are skipped in one jump of the optical pickup is fixed at a predetermined value (e.g., 40 tracks). When a compact disk including short songs (e.g., about 20 sec. or less) is subjected to a level search in a disk player, therefore, such short songs may be skipped even when such songs are programmed ones, resulting in that the level search cannot be conducted correctly.

Moreover, in the level search of the prior art, track jump and playback are repeated until the song changes, that is, until a time when the optical pickup jumps to one of the tracks of the next song and the song change is detected based on the data reproduced from the track. If the next song is not a programmed song, therefore, a song which does not have to be played back is unnecessarily played back.

FIG. 7 illustrates diagrammatically typical example of this kind of search, wherein PNO is the number of a programmed song and TNO is the number of a recorded song. As indicated by arrows in FIG. 7, the track jump and playback are performed in sequence three times from the beginning of the first programmed song PNO=01. Then, tracks are skipped and playback is performed for a fourth time, but in the fourth operation, the optical pickup jumps to the next song which is not programmed, i.e., song TNO=02 shown by the arrow of broken line), end playback is performed in non-programmed song TNO=02.

Similarly, in the level search of the second programmed song PNO=02, the optical pickup jumps to the next song TNO=04 which is=not programmed, and playback is performed in the song TNO=04.

In this way, in a level search of the prior art, songs which are not programmed are unnecessarily played back, and the recording level is set based on output signals obtained in playback operations including these unnecessary playback operations, resulting a situation where the recording level cannot be accurately set.

SUMMARY OF THE INVENTION

The disk player of this invention, which overcomes the above-discussed and numerous other disadvantages and deficiencies of the prior art, reproduces information from a disk-like information recording medium in which information is recorded in a plurality of sections of said medium and which has time-information related to the lengths of said sections, and comprises a level search function in which processes of reproduction end track jump of a reproducing head are alternatingly conducted to detect the output level of information recorded in said recording medium, and further comprises: reading means for reading said time-information from said recording medium; determination means for, depending upon time-information related to one of said sections, determining the degree of the track jump which is to be conducted in said one section; and level search means for conducting the track jump with said determined degree and performing the level search in said one section.

In preferred embodiments, said disk player further comprises memory means for storing the designations of selected ones of said sections from which ones information is to be reproduced.

In preferred embodiments, said determination means determine the degree of the track jump which is to be conducted in each of said selected sections; and said level search means perform the level search sequentially in said selected sections.

According to another aspect of the invention, the disk player reproduces information from a disk-like information recording medium in which information is recorded in a plurality of sections of said medium and which has time-information related to the lengths of said sections, and comprises a level search function in which processes of reproduction and track jump of a reproducing head are alternatingly conducted to detect the output level of information recorded in said recording medium, and further comprises: memory means for storing the designations of selected ones of said sections from which ones information is to be reproduced; reading means for reading said time-information related to said selected sections, from said recording medium; determination means for determining the degree of the track jump which is to be conducted in each of said selected sections; level search means for conducting the track jump with said determined degree end performing the level search sequentially in said selected sections; judging means for judging whether or not the next track jump with said determined degree can be conducted within the section where the level search is conducted; and long jump means for, when said judging means judges that the next track jump cannot be conducted within said one section, conducting a jump of said reproducing head to the beginning of the next section.

In the above configurations, said degree of the track jump may be the number of tracks to be jumped.

In the above configurations, said information may be two or more pieces of music which are respectively recorded in said sections.

In a preferred embodiment, said determination means determine the degree of track jump which is to be conducted in one selected section depending upon said time-information related to said selected section, the elapsed period of time for said selected section, and the period of time corresponding said degree of the track jump.

Thus, the invention described herein makes possible the objectives of:

(1) providing a disk player which can accurately perform a level search;

(2) providing a disk player which can accurately perform a level search even when information having a short length is recorded in a recording medium; and (3) providing a disk player in which the reproduction of unnecessary information during a level search can be prevented from occurring.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
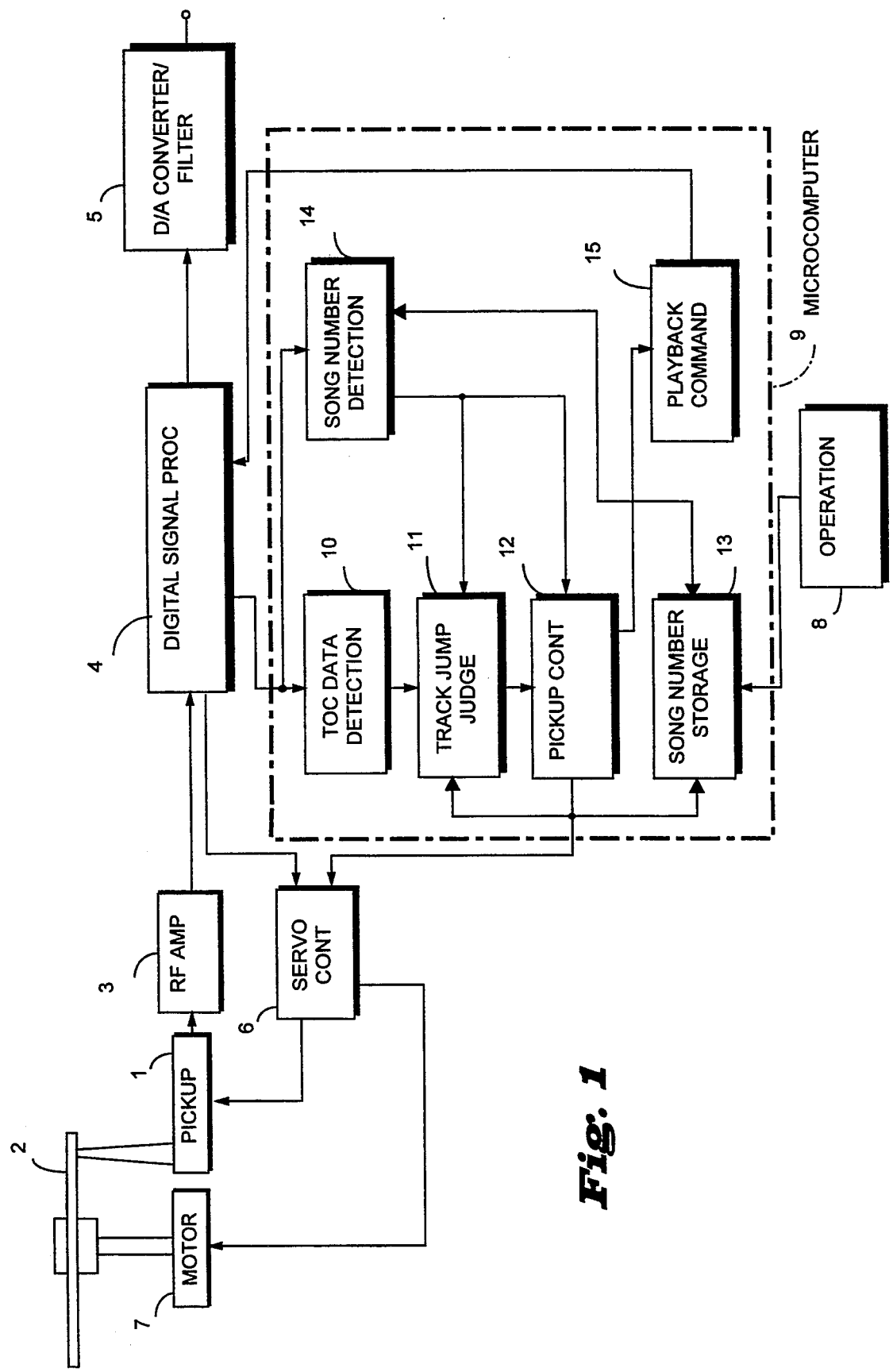
FIG. 1 is a block diagram of a CD player according to the invention.

FIG. 1 shows a CD player according to the invention. The CD player of FIG. 1 comprises: an optical pickup 1 which picks up the signal recorded on a compact disk 2; an RF amplifier 3 which amplifies the signal from the optical pickup 1; a digital signal processing circuit 4 which performs signal processes such as the EFM demodulation, subcode demodulation and error correction; a D/A converter-filter circuit 5 which performs D/A conversion of the data from the digital signal processing circuit 4 and filters the resulting analog data; a servo circuit 6 which performs the focus servo control, the tracking servo control for moving an objective lens (not shown) in a radial direction, the slide servo and rotation servo control for moving the pickup 1; a motor 7 which rotates the compact disk 2; an operation unit 8 having various operation keys such as a level search key, a programming key and the like; and a microcomputer 9.

The microcomputer 9 performs the overall control of the CD player, and comprises: a TOC (table of contents) data detection unit 10 which detects the TOC data recorded on the inside track of the compact disk 2; a track jump judging unit 11; a pickup control unit 12; a song number storage unit 13 which stores programmed song numbers; a song number detection unit 14 which detects the song number from subcodes included in the playback signal; and a playback command unit 15.

The CD player of FIG. 1 is provided with a programming function which stores song numbers selected by operation of the operation unit 8 and sequentially plays back the selected songs, and also with a level search function. When the user operates the level search key in the operation unit 8 in order to quickly confirm the output level of each of the programmed songs, the optical pickup 1 is jumped to the beginning of each of the selected songs and the track jump and playback are alternately repeated.

Figure 2:
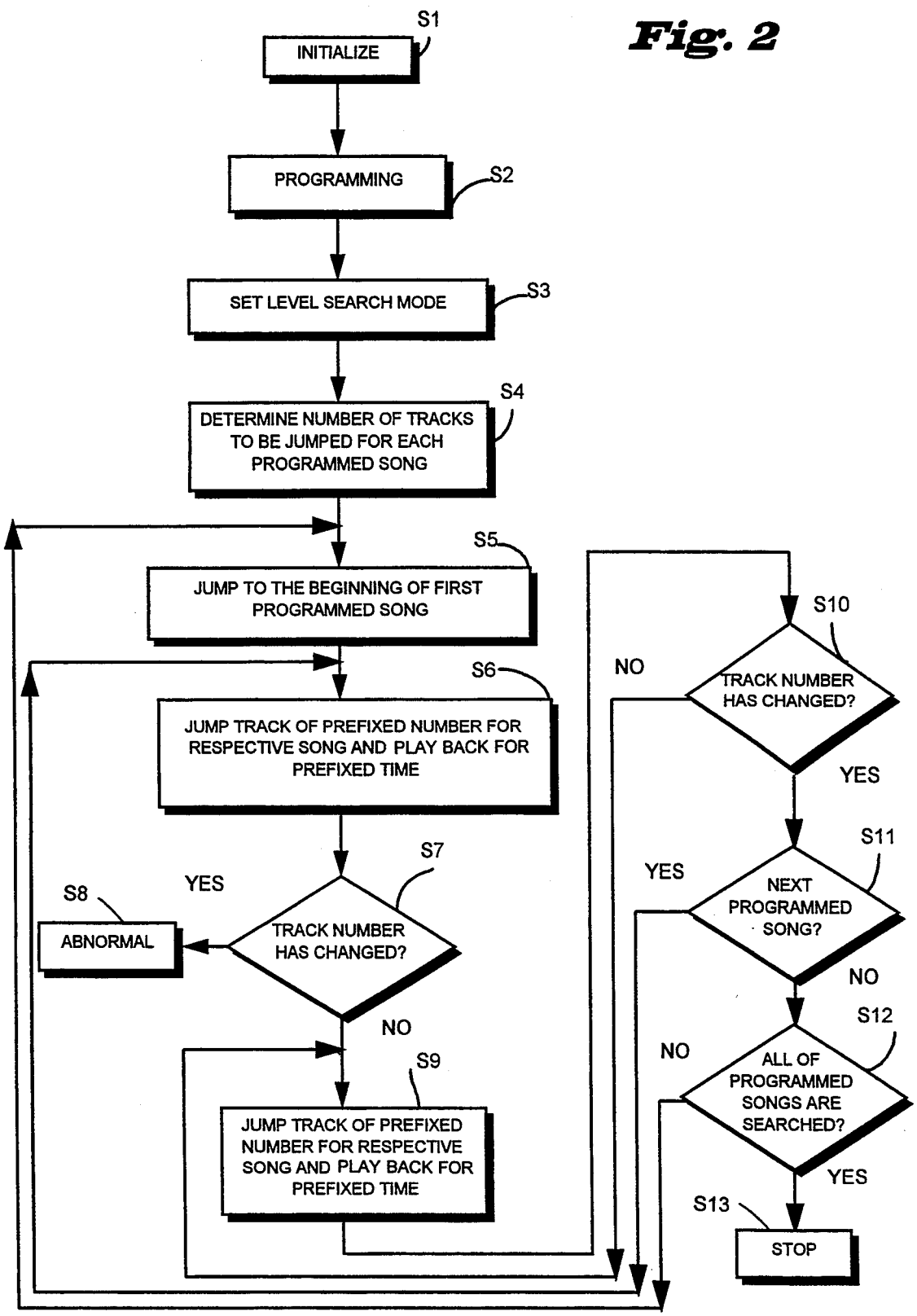
FIG. 2 is a flowchart of the level search in the CD player of FIG. 1.

Referring to FIG. 2, the level search in the CD player of FIG. 1 will be described.

First, when a compact disk is loaded, initialization is performed in step S1, i.e., the TOC (table of contents) data recorded on the inside track of the disk are read by the TOC data detection unit 10 to obtain the playing time of each song. Next, songs to be played back are selected by operating the operation unit 8 or performing the programming (step S2), and the numbers of the programmed songs are stored in the song number storage unit 13. The level search mode is then set by operating the level search key for performing a level search (step S3).

In the level search mode, for each of the programmed songs, the track jump judging unit 11 determines the number of tracks which are to be jumped, based on the playing time of each song which is included in the TOC data (step S4). More specifically, the number of tracks to be jumped is determined so that any programmed song is surely subjected to at least one level search or playback, even when the song is a short one. The optical pickup 1 is controlled by the pickup control unit 12 to jump to the beginning of the first programmed song (step S5). In step S6, then, the optical pickup 1 is moved to skip tracks the number of which equals that which was determined for the first programmed song in step S4, and, under the control of the playback command unit 15, the first programmed song is played back for fixed period of time (e.g., 100 ms.), and playback signals are output.

The song number detection unit 14 checks the subcode included in the playback signals obtained after the first track jump, to determine whether or not the song has changed (step S7). If the song number has changed, it is judged that the CD player is abnormal, and processing is stopped (step S8). As described above, the number of tracks to be jumped wag determined in step S4 so that any programmed song is surely subjected to at least one level search or playback, irrespective of the length of the song. Consequently, the song number cannot be changed after the first track jump. If the song number has changed, therefore, it is judged that the CD player is in an abnormal condition.

When it is judged in step S7 that the song number has not changed, processing proceeds to step S9 in which the optical pickup 1 is controlled to further jump over tracks the number of which is equal to that determined in step S4, and playback is performed. The song number detection unit 14 checks the subcode included in the playback signals obtained after the second track jump, to judge whether or not the song has changed (step S10). If the song number has not changed, processing returns to step 89 to repeat the track jump (of the determined number of tracks) and playback (of 100 ms).

If the song number detection unit 14 judges in step S10 that the song number has changed, then it is checked whether or not the song number is the next programmed song number stored in the song number storage unit 13 (step S11). If the song number is that of the next programmed song, processing returns to step S6, and steps S6 to S10 are repeated by using the track jump number for the next programmed song (which has been determined in step S4). If the song number is not that of the next programmed song, it is checked whether or not all of the programmed songs have been subjected to the level search (step S12). If YES in step S12, processing is stopped (step S13). If NO in step S12, processing returns to step S5 so that the pickup control unit 12 controls the pickup 1 to jump to the beginning of the following programmed song, and the above-mentioned processes are repeated.

In this way, according to this embodiment, the number of tracks which are skipped in one track jump in each of programmed songs is suitably determined for each programmed song, considering the playing time of the song. Even if programmed songs including a short song are subjected to the level search, therefore, such a short song will not be skipped, thereby assuring the correct level search.

Figure 3:
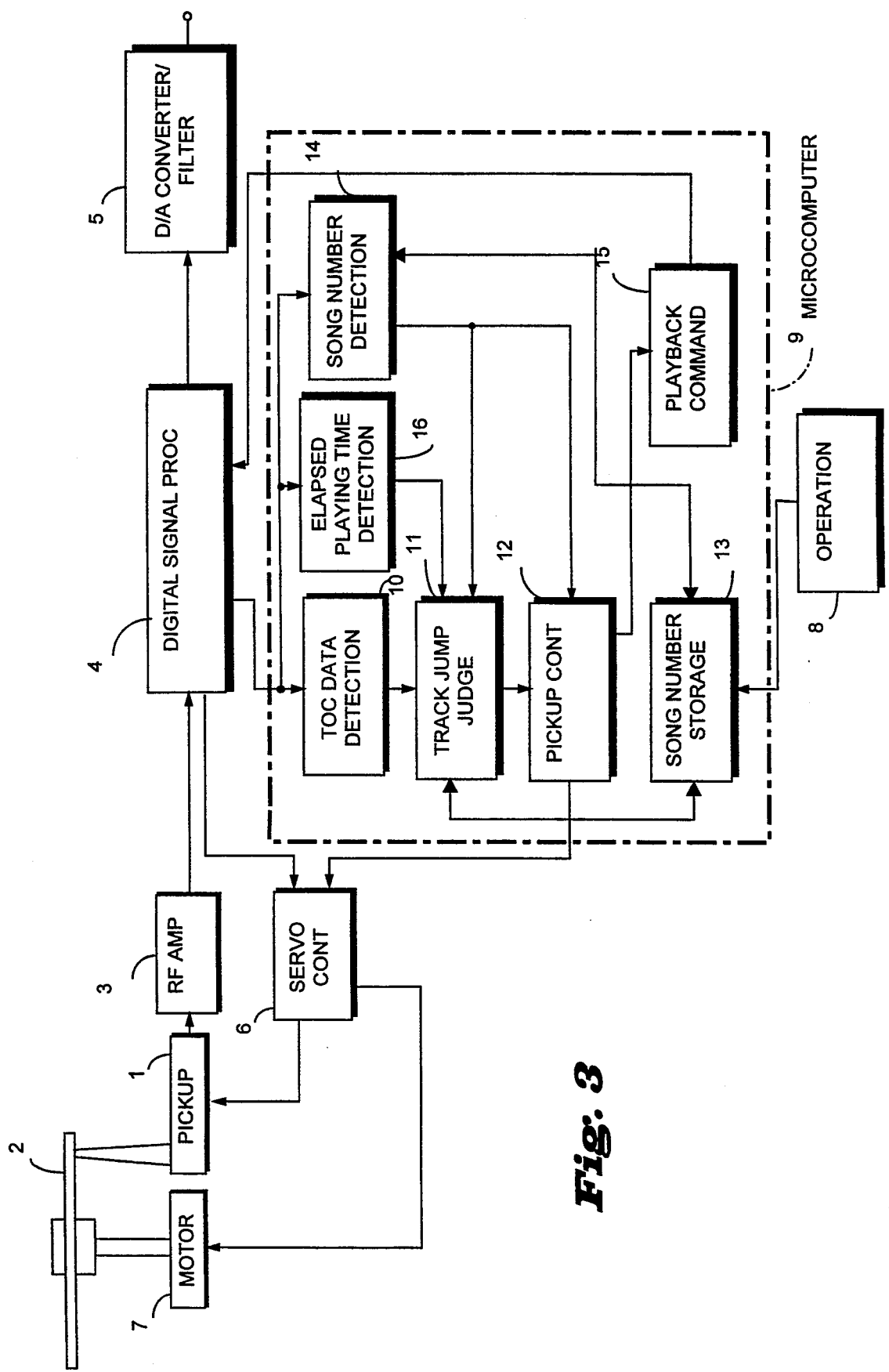
FIG. 3 is a block diagram of another CD player according to the invention.

FIG. 3 shows another CD player according to the invention. In the CD player of FIG. 3, the microcomputer 9 further comprises an elapsed playing time detection unit 16 which detects the period of elapsed playing time for a song currently undergoing a level check. According to this embodiment, in order to prevent the optical pickup 1 from landing on a non-programmed song and the song from being unnecessarily played back during the level search, the judging unit 11 successively judges whether or not the pickup 1 will land again on the same song as a result of a track jump, and the pickup control unit 12, based on the output of the judging unit 11, controls the pickup 1 so as to jump tracks when it can land on the same song again or to jump to the beginning of the next programmed song when it cannot land again on the same song.

The operation of the judging unit 11 will be described. The judging unit 11 judges whether or not the difference (T1−T2) between the playing time T1 of a currently played back song obtained from the TOC data and the elapsed playing time T2 of the same song obtained from the output of the elapsed playing time detection unit 16 is greater than the playing time T3 which corresponds to 40 tracks to be skipped (12 seconds in this embodiment). If the difference is greater than 12 seconds, then the judging unit 11 judges that the pickup 1 will land again on the same song when 40 tracks are skipped, but if the difference is less than 12 seconds, then it judges that the pickup 1 will not land on the same song again when 40 tracks are skipped.

For example, if the playing time of a song currently undergoing a level check is 5 minutes 30 seconds and the elapsed playing time (i.e., time the song has already played) is 5 minutes, then the difference between them is 30 seconds, and it is judged that the pickup 1 will land on the same song even when 40 tracks are skipped. If the elapsed playing time is 5 minutes 20 seconds, the difference is 10 seconds, and it is judged that the pickup 1 will land on the next song when 40 tracks are skipped.

Figure 4:
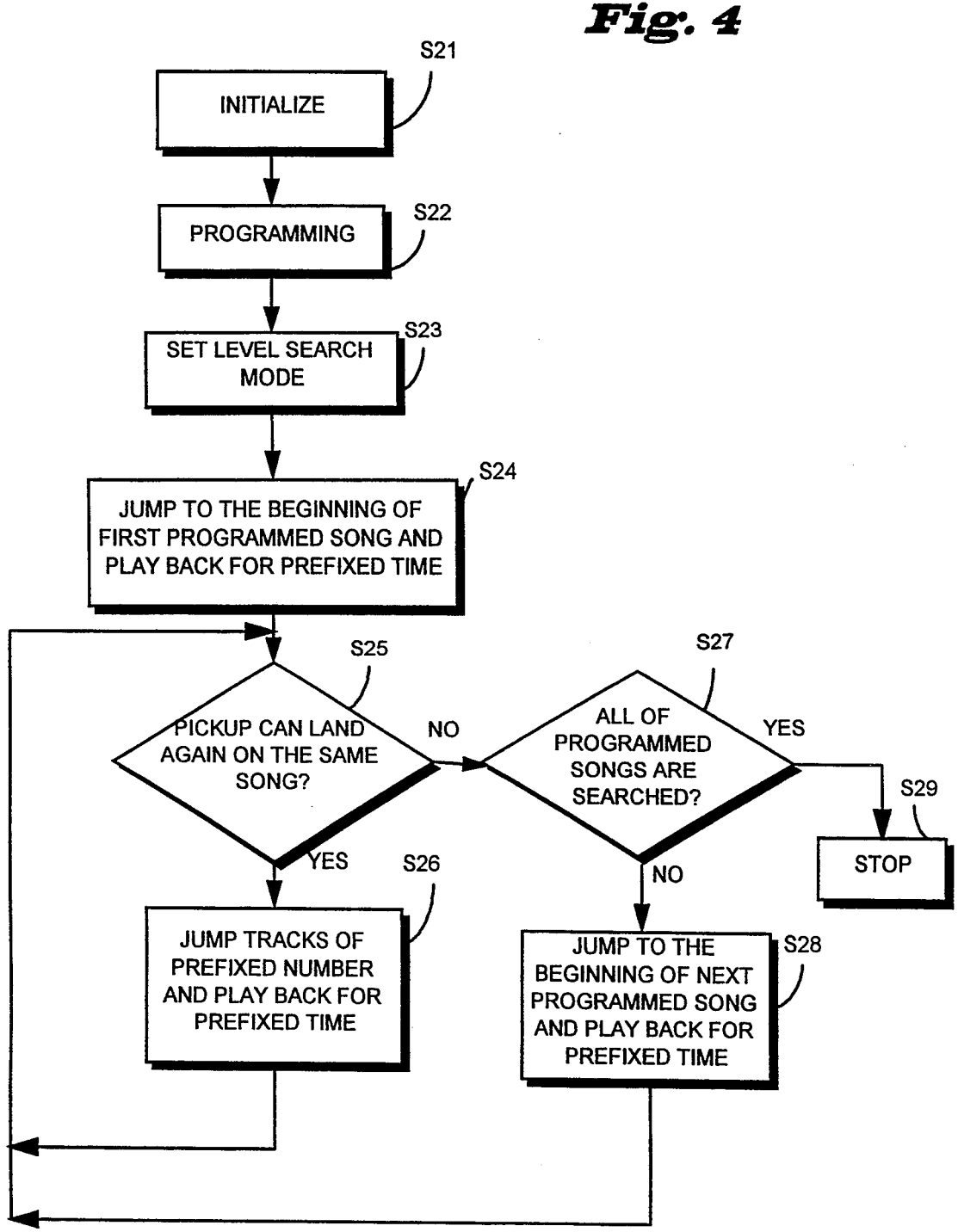
FIG. 4 is a flowchart of the level search in the CD player of FIG. 3.

With reference to the flowchart shown in FIG. 4, the level search in the CD player of FIG. 3 will be described.

In steps S21 to S23, the reading of the TOC data, selection or programming of songs to be played back, and setting of the level search mode are conducted in a similar manner as steps S1 to S3 in the first embodiment.

In the level search mode, the optical pickup 1 is controlled by the pickup control unit 12 to dump to the beginning of the first programmed song. Then, under the control of the playback command unit 15, the first programmed song is played back from the beginning for a fixed period of time (e.g., 100 ms), and playback signals are output (step S24).

Next, based on the playing time of the song according to the TOC data, the elapsed playing time according to subcodes contained in the playback signals and the playing time corresponding to the skipped 40 tracks, the judging unit 11 judges whether or not the pickup 1 will land again on the same song after skipping 40 tracks (step S25). If it is judged that the pickup 1 will land on the same song, then the pickup control unit 12 controls the pickup 1 so that it jumps 40 tracks, and the playback command unit 15 controls playback so it is performed for 100 ms (step S26), after which processing returns to step S25.

If it is judged in step S25 that the pickup 1 cannot land on the same song, then processing proceeds to step S27 in which it is judged whether or not all of the programmed songs have been subjected to the level search. If YES in step S27, then the level search is stopped. If NO in step S27, then the pickup control unit 12 controls the optical pickup 1 so as to jump to the beginning of the next programmed song, and under the control of the playback command unit 15 the next programmed song is played back for 100 ms from the beginning of the song, and playback signals are output (step S28), after which processing returns to step S25.

According to this embodiment, the judgment as to whether or not the pickup 1 can land again on the same song is done before the jump of the pickup 1. When it is judged that the pickup 1 can land on the same song, the pickup 1 jumps the predetermined number of tracks. When it is judged that the pickup 1 cannot land on the same song, the pickup 1 jumps to the beginning of the next programmed song so that unwilling playback of non-programmed songs can be avoided.

Figure 5:
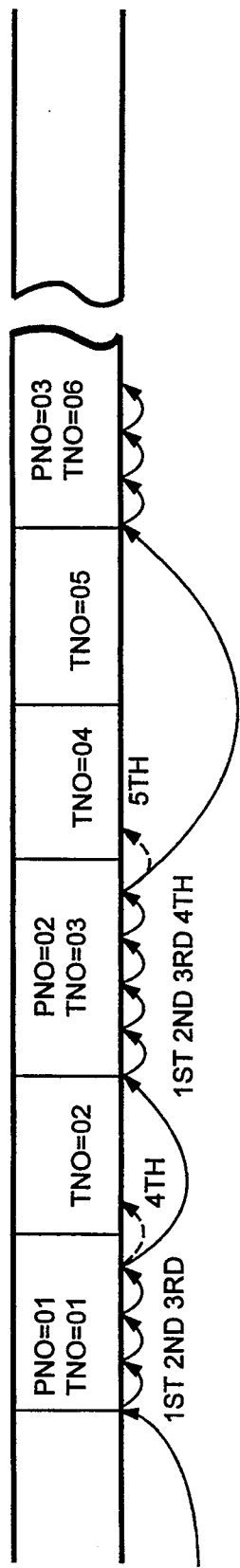
FIG. 5 illustrates diagrammatically the level search in the CD player of FIG. 3.
Figure 7:
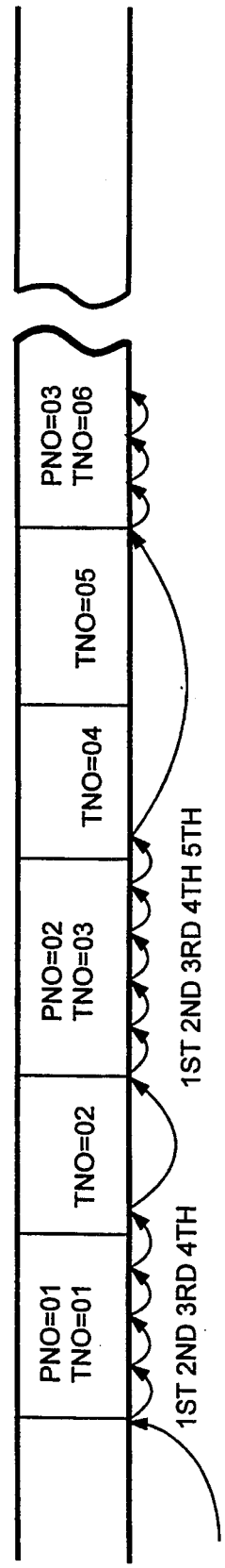
FIG. 7 illustrates diagrammatically the level search in the conventional CD player.
Figure 6:
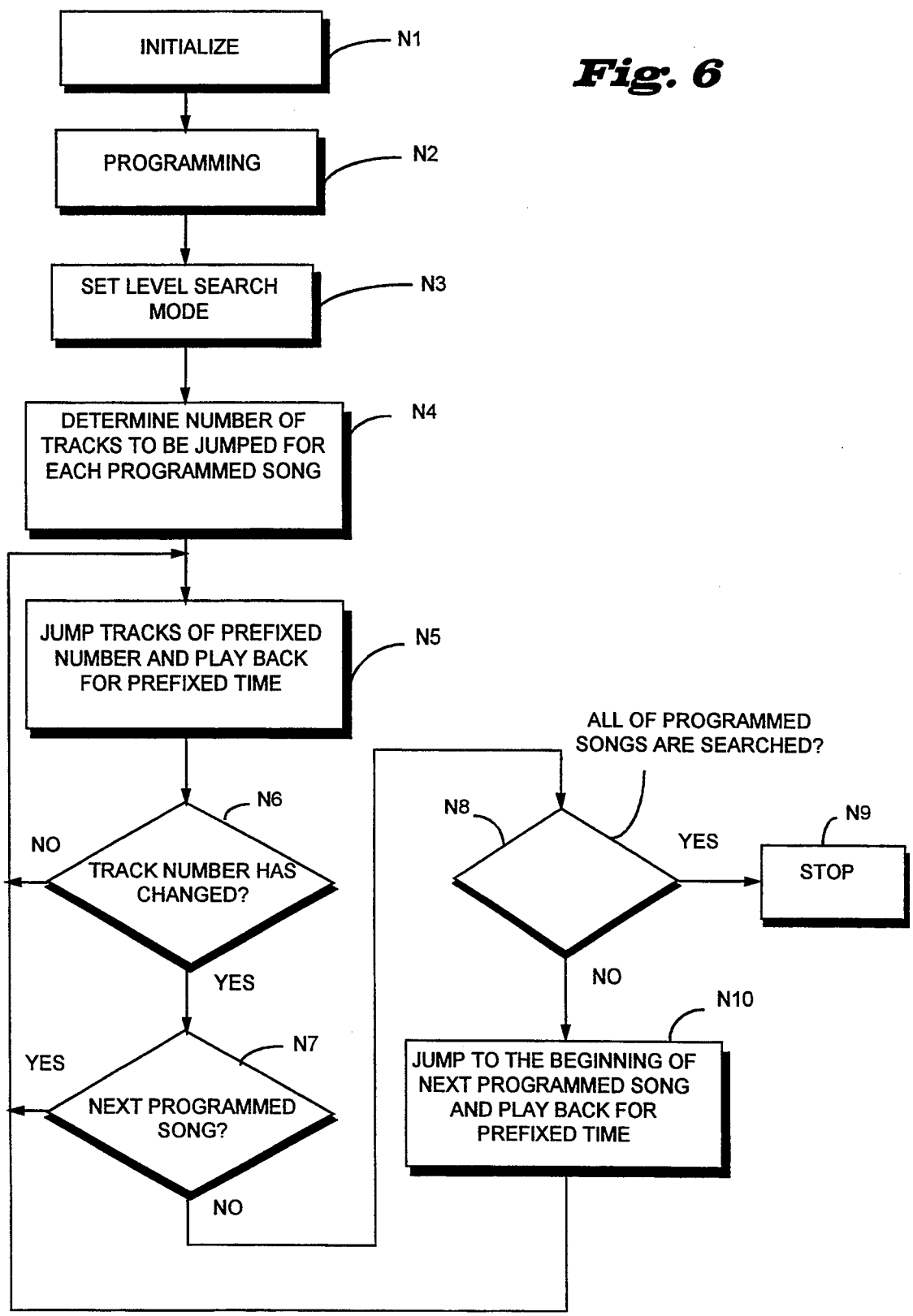
FIG. 6 is a flowchart of the level search in a conventional CD player.

FIG. 5 diagrammatically illustrates the level search according to this embodiment. For example, the track jump and playback are performed in sequence three times from the beginning of the programmed song PNO=01 (as indicated by three short arrows) because it is judged that the pickup 1 can land on the song PNO=01. After the third level search, it is judged that the pickup 1 cannot land again on the song PNO=01 or will land on the next song TNO=02 which is a non-programmed one. Instead of a fourth short track jump, therefore, a long jump of the pickup 1 is done so that the pickup i skips the non-programmed song TNO=02 to jump to the beginning of the next programmed song PNO=02, and the level search is performed in the song PNO=02.

Similarly, in the first to fourth jumps on the programmed song PNO=02, it is judged that the pickup 1 can land on the programmed song PNO=02. After the fourth level search for the programmed song PNO=02, it is judged that the pickup 1 cannot land on the song PNO=02. In the fifth jump, therefore, the pickup 1 skips the non-programmed songs TNO=04 and TNO=05 to jump to the beginning of the next programmed song PNO=03, and the level search is performed in the song PNO=03.

In this embodiment, 40 tracks are skipped by one jump, but alternatively, the number of tracks to be skipped may be changed based on the playing time of each song. In this alternative embodiment, the playing time corresponding to the number of skipped tracks can be changed as required from the 12 seconds in the above embodiment. For example, 40 tracks could be skipped as in the above embodiment in songs with playing times longer than 30 seconds, and 10 tracks could be skipped in songs with playing times shorter than 30 seconds, so that the playing time corresponding to 40 tracks could be set at 12 seconds and the playing time corresponding to 10 tracks could be set at 3 seconds.

According to this embodiment, it is successively judged whether or not the pickup can land again on the same song in level search, and if the pickup can land on the same song, then the predetermined number of tracks are skipped, but if the pickup cannot land on the same song, then it is skipped to the beginning of the next programmed song, whereby the pickup is prevented from landing on non-programmed songs. Therefore, level search can be accurately performed.

In the above described embodiments, songs to be played back are previously programmed. This invention can be applied also to a disk player without such a programming function. Although CD players have been described as the embodiments of this invention, moreover, it is apparent to those skilled in the art that this invention can be applied to disk players of other types.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A disk player for reproducing information from a disk-like information recording medium having a plurality of tracks in which information is recorded, said recording medium comprising a Table of Contents (TOC) Area and an area wherein said information is organized in a plurality of sections, each of said sections having a respective time length, said recording medium also having time-information recorded therein which is indicative of the playing time length of each of said sections, and wherein when said recording medium is loaded in said disk player, information recorded in said Table of Contents (TOC) Area is read, information to be reproduced is selected by performing a programming operation, and a track of said information is searched based on said information recorded in said Table of Contents (TOC) Area, said disk player comprising:

a reproducing head for reading said recorded information, said recorded information containing said time-information;

detecting means for detecting said time-information recorded in said Table of Contents (TOC) Area and read by said reproducing head when said recording medium is loaded into the disk player;

judging means for receiving said detected time-information from said detecting means and for determining a degree of tracks to be track jumped corresponding to said detected time-information;

track jump means for receiving said degree of tracks from said judging means and for changing a relative location of said reproducing head; and level search means, connected to said track jump means and said reproducing head, for alternately initiating said track jump of said reproducing head and a reproduction of said recorded information in at least one of said sections and for detecting one or more output levels of said recorded information.

2. A disk player according to claim 1, said level search means alternately initiating said track jump and said reproduction of said recorded information in two or more of said sections, said disk player further comprising:

programming means for inputting data and for programming an operation of said disk player; and memory means for storing said input data, a portion of said input data being used to identify said two or more of said sections.

3. A disk player according to claim 2, wherein said judging means determine the degree of the track jump which is to be conducted in each of said selected sections; and said level search means perform said track jump and said reproduction of said information sequentially in said selected sections.

4. A disk player according to claim 1, wherein said degree of tracks to be track jumped is the number of tracks to be jumped.

5. A disk player for reproducing information from a disk-like information recording medium having a plurality of tracks in which information is recorded, said recording medium comprising a Table of Contents (TOC) Area and an area wherein said information is organized in a plurality of sections, each of said sections having a respective tee length, said recording medium also having time-information recorded therein which is indicative of the playing time length of each of said sections, and wherein when said recording medium is loaded in said disk player, information recorded in said Table of Contents (TOC) Area is read, information to be reproduced is selected by performing a programming operation, and a track of said information is searched based on said information recorded in said Table of Contents (TOC) Area, said disk player comprising:

programming means for inputting data and for programming an operation of said disk player, said data containing data indicating an order of said recorded information to be reproduced;

a reproducing head for reading said recorded information, said recorded information containing said time-information;

detecting means for detecting said time-information recorded in said Table of Contents (TOC) Area and read by said reproducing head when said recording medium is loaded into said disk player;

first judging means for receiving said detected time-information from said detecting means and for determining a degree of tracks to be jumped corresponding to said detected time-information;

track jump means for receiving said degree of tracks from said first judging means and changing a relative location of said reproducing head;

level search means, connected to said track jump means and said reproducing head, for alternately initiating said track jump of said reproducing head and a reproduction of said recorded information in two or more of said sections sequentially and for detecting output levels of said recorded information;

memory means for receiving said data from said programming means and for storing said data;

second judging means for receiving said detected time-information from said detecting means and for judging whether or not a next track jump by said degree of tracks can be initiated by said level search means such that said reproducing head remains within the section where the level search is currently being conducted; and long jump means for, when said second judging means judges that said reproducing head will not remain within said section where the level search is being conducted, causing said reproducing head to jump to a beginning of another section corresponding to said data which is stored in said memory means.

6. A disk player according to claim 5, wherein said degree of the tracks to be tracked jumped is the number of tracks to be jumped.

7. A disk player according to claim 5, wherein said first judging means determines the degree of track julep which is to he conducted in one selected section based on said time-information related to said selected section, an elapsed period of playing time in said selected section, and a period of time corresponding to said degree of the track jump.

8. A disk player for reproducing information from a disk-like information recording medium having a plurality of tracks in which information is recorded, said recording medium being organized in a plurality of sections, each section including a plurality of tracks, each of the sections having a respective playing time length, the recording medium also having recorded thereon time-information which is indicative of the playing time length of each of the respective sections, the disk player comprising:

operation means for producing indications of selected sections which are to be reproduced;

reproducing means for reading the recorded information and for producing reproduction signals indicative of the read information;

servo means upon which the reproducing means is mounted for changing the relative location of the reproducing head relative to tracks on the medium;

means for storing the indications of selected sections which are to be reproduced;

detecting means, connected to the reproducing means and the storage means, for obtaining, from the reproduction signal, the time-information for each section to be reproduced;

control means for conducting a level search to obtain, from the reproduction signals, signals indicative of output levels of sections to be reproduced and for outputting a control signal based on the reproduction signals and the indications of selected sections to the servo means, the servo means controlling said reproducing means in accordance with the control signal; and, means, connected to the control means and the detecting means, for determining a degree of tracks to be track jumped by which the reproducing means is moved for a section to be reproduced, said degree of tracks to be track jumped for a given section being dependent upon the time-information for that section.

9. A method of conducting a level search in a disk player which reproduces information from a disk-like information recording medium having a plurality of tracks in which information is recorded, said recording medium being organized in a plurality of sections, each section including a plurality of tracks, each of the sections having a respective playing time length, the recording medium also having recorded thereon time-information which is indicative of the playing time length of each of the respective sections, the disk player comprising:

reading the recorded information by a reproducing means and producing reproduction signals indicative of the read information;

storing indications of selected sections which are to be reproduced;

obtaining, from the reproduction signals, the time-information for each section to be reproduced;

conducting a level search to obtain, from the reproduction signals, signals indicative of output levels of sections to be reproduced;

outputting a control signal based on the reproduction signals and the indications of selected sections;

controlling the reproducing means in accordance with the control signal;

determining, for a section to be reproduced, a degree of tracks to be track jumped for that section in accordance with the time-information for that section.

* * * * *

UNITED STATES PATENT AND TRADEMARK OFFICE
CERTIFICATE OF CORRECTION

PATENT NO. : 5,363,354
DATED : November 8, 1994
INVENTOR(S) : Yoichi TABUCHI

It is certified that error appears in the above-identified patent and that said letters patent is hereby corrected as shown below:

Column 5, line 42, please change "89" to -- S9 --;

Column 7, line 30, after "pickup" please change the letter "i" to the number -- 1 --;

Column 9, line 12, please change "tee" to -- time --;

Column 9, line 62, please change "tracked" to -- track --;

Column 9, line 65, please change "julep" to -- jump --;

Column 9, line 66, please change "he" to -- be --.

Signed and Sealed this

Fourth Day of April, 1995

Attest:

BRUCE LEHMAN

*Attesting Officer*     *Commissioner of Patents and Trademarks*